United States Patent Office 2,718,580
Patented Sept. 20, 1955

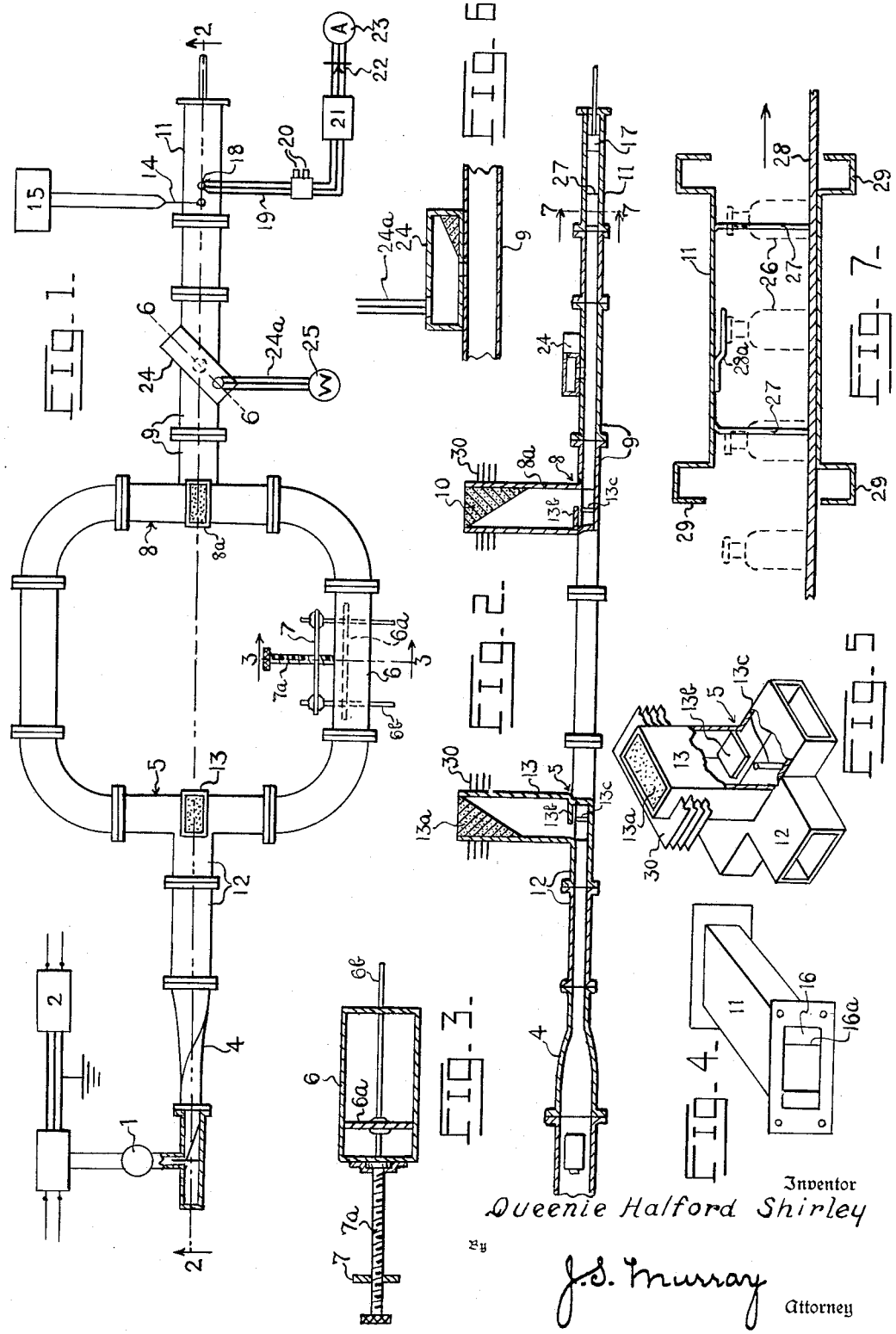

2,718,580

METHOD AND APPARATUS FOR ELECTRICALLY HEATING DIELECTRICS

Queenie Halford Shirley, Windsor, Ontario, Canada, assignor to Frederick Shirley, Windsor, Ontario, Canada Application August 22, 1951, Serial No. 243,135

2 Claims. (Cl. 219—10.55)

This invention relates to heat treating and particularly to methods and apparatus for baking colors and organic finishes upon dielectric materials, and fusing vitrifiable enamels upon glassware, china and pottery.

In glassware after it has been formed in a mold and annealed, it is necessary when it has to be decorated with fusible colors, that the vitrifiable enamels be applied to the glass object at room temperature. Then the article is preheated prior to being conveyed into the "firing zone" of a lehr or kiln at which time the vitrifiable enamels fuse into the glass. After the color is fused on the glass it is subject to a gradually reducing temperature until the glass has been cooled to room temperature. In the case of solid colors the ware can be dipped, sprayed, or handpainted and then conveyed into a decorating lehr or similar heat treating kiln for the fusing of the colors upon the ware.

The process of fusing colors into glassware, as now known to the art, includes conveying the ware on a continuously traveling steel alloy belt through a lehr subjecting such ware to a temperature which gradually rises from room temperature as the belt advances until the ware reaches the "firing zone" where it is subject to a temperature at which the ceramic colors will fuse on to the ware, and then to a gradually reducing gradient to a normal room temperature.

The temperature necessary to fuse what is known as "ceramic or vitrifiable color" upon glassware is in the order of magnitude 1050° F. to 1150° F., and the equalization temperature at which it is necessary to hold the ware for release of permanent strains therefrom at the start of the annealing process proper is in the magnitude of 950° F. to 1000° F. for certain average types of glassware having compositions well known to the art. Of course, the equalizing temperature will vary to some extent depending primarily on the glass formulation and to a lesser extent on the type of glassware.

While there are many types and designs of decorating lehrs, they are all built on the same fundamental principles for decorative glassware which has a low thermal conductivity, heating thereof being effected by conduction from the outside. The result is a temperature gradient from the outside toward the center and consequent uneven expansion of the material. The time necessary for the center to reach a certain temperature depends on the specific conductivity of the glass and is a function of the temperature gradient. If the surface is heated too rapidly the glass will disintegrate, wherefore it has heretofore been necessary to heat the glass gradually in a preheating section of a lehr, this process consuming considerable time.

A primary object of the present invention is to reduce the time requisite to bring glassware up to the temperature desired by making such ware form part of the dielectric material in an ultrahigh frequency line, whereby the required heat is generated by molecular hysteresis. My improved apparatus for fusing vitrifiable enamels upon glass is as follows:

A magnetron operating at a frequency such as 3000 megacycles per seond is used, although the requisite electrical energy may equally well be supplied by any other high frequency generator such as a klystron, and other ultra high frequencies may be used. Alternating current from the usual 110 volt, 60 cycle line may be delivered to the filament transformer of the magnetron and a D. C. power source may supply direct current to the magnetron anode. The magnetron is coupled to a waveguide of suitable cross-section, preferably rectangular. The glass to be treated is placed in a cavity resonator to which electrical energy is supplied by the magnetron, as by means of a waveguide circuit.

The line delivering energy to the cavity resonator can take various forms. The one shown in the accompanying drawing was chosen because it affords a method of controlling the amount of energy flowing to the resonator, and cuts down power loss, and also affords protection for the magnetron against high voltage standing waves.

The temperature rise of the glass may be measured by means of a thermocouple inserted in the cavity resonator perpendicular to the electric field and constructed as follows. Two different metals such as copper and constantine, Chromel and Alumel or platinum and rhodium may be used, the choice depending on the final temperature to be attained by the glass. The inner ends of the dissimilar metals are maintained in contact with each other by means of a refractory tube, welding or other suitable means, and the refractory tube containing the thermocouple wires is in turn mounted in fine non-magnetic metal tubing so that high frequency currents will not be generated in the thermocouple wires and so burn them out. This assembly is then passed transversely through small holes in the narrow side of the waveguide and is perpendicular to the electric field. It may or may not pass through the dielectric material to be heated. The free ends of the wires are then attached to a suitable potentiometer preferably calibrated in degrees. The cavity resonator may be of any desired shape and energy may be supplied to the cavity by means of a waveguide and capacitive, resonant, or inductive iris, or other suitable means. A plunger used for tuning the cavity may be of the constant type or non-contacting choke type as shown in the accompanying drawings although other designs can be used successfully.

The frequency to which the resonator is tuned will be in the ultra-high frequency range from 1000 to 3000 megacycles. At such high frequencies the glass is heated by molecular hysteresis because the polarity of the glass molecules is constantly reversed. The force necessary to reverse the polarity of the molecules is a function of the potential between the electrodes, and when this potential is held constant the rate at which the temperature rises becomes a function of the applied frequency.

The object upon which the color is to be fused forms part of the dielectric material. As the polarity of the molecules of the entire object reverses instantaneously when the correct potential and frequency are applied, there will be no strain set-up in the glass, and no time will be required for penetration of heat by conduction from the outside toward the center of the glass, so that the object can be brought up to a temperature desired much more rapidly.

The chief benefit of this method of heating dielectric materials such as glass, steatite, rubber, plastic and the like, is the rapidity with which the heating is accomplished as compared with any other method known to the art.

Having thus briefly and broadly outlined some of the major objects and advantages of the invention, I will now proceed to describe a preferred embodiment thereof with the aid of the accompanying drawings, wherein:

Fig. 1 is a diagram of my improved apparatus, including a top plan view of a system of wave guides.

Fig. 2 is a view of the wave guide system in vertical section taken on the line 2—2 of Fig. 1.

Fig. 3 is a cross-section view of a phase shifter which serves as one of the controls for the waveguide system, the plane of such section being indicated at 3—3 in Fig. 1.

Fig. 4 is a perspective view of the cavity resonator.

Fig. 5 is a perspective view of one of two hybrid T's required in the waveguide system.

Fig. 6 is a vertical sectional view of a directional coupler used in the system, the section being taken on the line 6—6 of Fig. 1.

Fig. 7 is a cross sectional view of the cavity resonator, taken on the line 7—7 of Fig. 2 and showing how articles requiring heat treatment may be carried through the electrical field of said resonator.

Energy is supplied to the circuit by a continuous wave magnetron 1 connected to a standard alternating current source through a rectifier 2, which converts the alternating current to direct current serving to energize the magnetron anode.

The magnetron 1 is attached through a suitable connector to the rectangular waveguide forming the main part of the circuit. In order to bring the broad dimension of the waveguide in a horizontal position a section 4 having a 90° twist is inserted adjoining the section mounting the magnetron.

The circuit is divided into two branches by means of a hybrid T 5, best shown in Fig. 5. The properties of a hybrid T or magic T are such that energy transmitted by the waveguide will divide equally between the two side arms of said T, but will not propagate in the vertical arm of this T. In one branch of this divided circuit there is a phase shifter 6, formed by inserting an elongated plate 6a of polystrone or other suitable dielectric material in the waveguide in such a manner that it can be adjusted horizontally, parallel to the broad dimension of the waveguide. The phase shifter comprises an adjusting screw 7a taking effect on a cross piece 7 exterior to the waveguide as best appears in Fig. 3. Said cross piece terminally and rigidly carries a pair of rods 6b slidable in the waveguide and mounting the plate 6a when the plate 6a is shifted from either side wall toward the axis of the waveguide, this has the effect of lengthening the waveguide from an electrical standpoint, although actual physical length of the waveguide remains unchanged. The branches of the divided circuit at their ends nearest the load are connected to opposed side arms of a second hybrid T 8. If said branches have the same length from an electrical standpoint, the energy traveling toward the load in one branch will be in phase with that delivered by the other branch when the energies from the two branches meet at the T 8. When this is the case, all the energy (i. e., from both branches) will be transmitted to the arm 9, which is in the same plane as the two side arms (i. e., the horizontal arm) and no energy will go to the vertical arm 13 perpendicular to such plane. If, however, the electrical length of one branch exceeds that of the other branch because the plate 6a has been moved to some position spaced from the side walls of the waveguide, the energy going toward the load from one branch will arrive at the T 8 out of phase with the energy from the other branch. When this is the case, the energy from one branch may be exactly 180° out of phase with that from the other branch, and the energy from both branches will then propagate or travel in the vertical arm 8a of the T 8, and none will go to the horizontal arm 9 occupying the same plane as the two side arms. If the energy from one branch is not 180° or 0° out of phase with that from the other branch, part of the energy traveling towards the load will go to the vertical arm and part to the horizontal arm 9. The percentage of the toal energy going to the vertical and horizontal arm depends on the phase angle between the energy from one side arm with respect to that from the other side arm when such energies combine at the T 8.

A dummy load 10 is placed in the vertical arm 8a to absorb any excess of energy, and the useful load or the cavity resonator 11 in which material is to be heated is placed on the horizontal arm 9. The position of the dummy load 10 and the cavity resonator 11 may be reversed if desired. It can be seen from the foregoing that energy delivered to material to be heated may be regulated to any desired value. This is highly desirable, permitting the rate of heating of the material to be controlled and the final temperature reached by the material to be limited to a desired value.

It is well known in electrical engineering that if a load is not matched to the line there will be a voltage standing wave on the line and consequently some of the energy in the line will be reflected and returned to the source of supply, which in this case would be the hybrid T 8 nearest the load. This energy would then divide equally between the opposed side arms of the hybrid T 8, but would not propagate or travel in the vertical arm 8a of this T. When reflected energy in the two branches reaches the T 5, if such energy in one branch is in phase with that reflected through the other branch, the total energy will all go toward the magnetron (i. e., the reflected energy from both branches will propagate in the arm 12 which mounts the magnetron), and none of the energy will be delivered to the vertical arm 13 of the T 5. The phase shifter 6 is so constructed that it can never have the same electrical length as a plain section of waveguide of the same physical length. This means the reflected energy from one branch will never be exactly in phase with energy reflected from the other branch when such energies join at the T 5. This in turn means that part of the reflected energy from the two branches may propagate in the horizontal arm 12 mounting the magnetron, and part will go to the vertical arm 13. A matched load 13a is mounted in said arm 13 to absorb such unwanted energy as may be delivered to such arm. If the condition should arise where energy reflected from one branch is exactly 180° out of phase with energy reflected from the other branch, then all the reflected energy will propagate in the vertical arm 13 and be absorbed by the matched dummy load 13a, and none will travel in the horizontal arm 12. In each of the T's 5 and 8 there is preferably inserted an inductive iris 13b and a matching stub 13c, assuring that the impedance seen looking into the arms of these T's will be the characteristic impedance of the waveguide.

A specially shielded thermocouple 14 is inserted in the cavity resonator 11 perpendicular to the electric field and in contact with the dielectric material being heated. The thermocouple wires are welded at the tips and are inserted in ceramic tubing or other insulating tubing which in turn is inserted in nonmagnetic metal tubing, so that high frequency currents will not be generated in such wires and cause them to burn up. The other ends of the thermocouple wires are connected to a potentiometer 15, which may have a scale calibrated in degrees centigrade to facilitate reading.

Different shapes and designs of cavity resonators may be used, and there are a number of different methods of coupling power from a waveguide to a cavity resonator. The illustrated arrangement uses a thin sheet 16 of conducting material such as metal with a rectangular hole 16a cut in it and placed across the waveguide on which the useful load is mounted (i. e., the horizontal arm 9 of the second hybrid T 8). This rectangular hole is centered with respect to the broad dimension of the waveguide and extends from the top to the bottom of the waveguide in the narrow dimension of the waveguide. The size of the hole in the direction of the broad dimension of the waveguide may be varied to suit the load to be heated and the electric field intensity required in the cavity resonator. Another section of waveguide is attached at this point and the end opposite to that at which the metal containing the hole is placed (i. e., the iris 16) is closed by inserting a short circuiting plunger 17, a cross section of this plunger being shown in Fig. 2. After the dielectric material to be heated is placed in the cavity resonator, the plunger is moved back and forth until the resonator is in resonance, at which time the resonator should very nearly or absolutely present a matched load to the line. One way of telling when the resonator is in resonance is to insert a probe 18 which in turn is connected through a coaxial cable 19, tuning stubs 20, attenuator 21, and crystal rectifier 22 to a D. C. microammeter 23. When the meter reads a maximum the cavity resonator is in resonance and the maximum amount of power will go to the cavity resonator and little or no power will be reflected back toward the second hybrid T 8. The phase shifter 6 is then adjusted to allow a desired amount of energy to go to the horizontal arm 9 of the hybrid T 8 on which the resonator 11 is mounted, this controlling the rate at which the temperature of the dielectric material rises. If desired (although not necessary) a directional coupler 24 can be inserted in the horizontal arm 9 of the second hybrid T 8 between such T and the cavity resonator, and may be connected as at 24a to a microwave wattmeter 25. A directional coupler is a device that allows a known percentage of the energy present in a waveguide to be transmitted through a coaxial cable to an energy meter. This directional coupler is shown in Fig. 6 and is used to measure the energy going to the useful load.

It has been found in most instances desirable to have the dielectric material to be heated in contact with the top and bottom of the cavity resonator and parallel to the electric field. Most materials will heat satisfactorily even when some other dielectric material is inserted between said top and bottom and the material to be heated provided the material is parallel to the electric field. In some instances this is desirable, because the heat conductivity of copper is approximately 1000 times greater than that of most dielectric materials, and this may cause the ends of the dielectric material being heated to be much cooler than the rest of such material, which is not desirable. If another dielectric material is inserted between the metal waveguide and the material to be heated, this effect will be substantially reduced.

Fig. 7 illustrates a desirable provision for delivering dielectric articles 26 to and from the resonator 11. Thus said resonator has its side walls formed with opposed openings 27, through which a conveyor belt 28 of a suitable insulating nature (such as Teflon) travels across the resonator floor. The articles to be heat treated are carried by said belt in suitable spaced relation, and the conveyor travel may be either continuous and gradual or intermittent. The upper extremities of the articles 26 are engaged, at least during the heating interval, by an element 28a of dielectric nature carried by the resonator roof. Said element is preferably of a spring nature adapting it to engage the articles under a definite light pressure. Marginal to each opening 27, above and below the latter, there are provided paired U-shaped lateral extensions 29 from the roof and floor of the resonator. These extensions are proportioned to form quarter wave traps such as will resist any loss of energy through said openings.

The dummy loads 10 and 13a may be variously formed, it being preferred, however, to form these loads of a composition molded to the proper shape and comprising 65% powdered flake graphite and 35% Portland cement. Preferably the loads 10 and 13a will fully close the upper ends of the corresponding vertical arms and will have bottom faces acutely inclined to the axes of said arms, such faces having been found to avoid or at least minimize downward reflection of energy. The arms 13 and 8a are shown equipped with fins 30 to expedite dissipation of heat.

The described apparatus accomplishes its baking or fusing function, in applying inorganic materials, in substantially three minutes as compared to two and one half to four hours required by lehrs and methods heretofore employed. In the case of organic finishes, forty seconds suffices for my apparatus as compared to thirty-five minutes heretofore necessary. Floor space required by my apparatus is about one tenth of that heretofore required.

While the foregoing is the preferred embodiment of the invention and I have described the basic principles of same, it is understood that further alterations and modifications may be made thereto within the scope of the appended claims.

What I claim is:

1. High frequency heating apparatus for baking colors and fusing vitrifiable enamels on glass ware, comprising a high frequency electric energy generator; a resonator cavity in which an article to be heated is placed; plunger means for varying the capacity of the cavity to tune the same into resonance with the generator frequency; energy transmission means for transmitting the exact portion of the energy of said generator required to heat the glassware article to the required heat; said transmission means formed of hollow wave guides comprising two parallel branches, an input T coupling at the input ends of said branches, an output T coupling at the output end of said branches, each of said T couplings being formed with an arm transverse to the plane of said parallel branches; dummy energy absorbing load elements disposed in said arms; phase varying means in one of said parallel branches for adjusting the effective length of one of said branches to determine the desired component of energy which shall be transmitted to said cavity to secure the required heating of the article; an inductive iris coupling said wave guide means with said resonator cavity; thermocouple temperature indicating means communicating with said resonator cavity to indicate the temperature to which said phase varying means may be adjusted; means for determining when the cavity is tuned to resonance with the frequency of the resonator after the article has been placed in heating position, including a probe element extending into said cavity, means for indicating the amount of energy delivered to said probe element comprising a wattmeter and attenuator means connecting the probe element with said wattmeter; and conveyor means of dielectric material for carrying the articles into and out of said cavity through inlet and exit openings in the side walls thereof, there being dielectric material attached to the interior of the top wall of said cavity and adapted to contact the top of the articles and to space the same from the top conducting surface of the cavity.

2. High frequency heating apparatus for fusing colors and vitrifiable enamels on glassware as defined in claim 1, including wave traps at the top and bottom of said openings to prevent escape of high frequency energy from the apparatus.

References Cited in the file of this patent

UNITED STATES PATENTS

| | | |
|---|---|---|
| 2,086,615 | Grundmann | July 13, 1937 |
| 2,235,521 | Higgins | Mar. 18, 1941 |
| 2,259,935 | Johnson | Oct. 21, 1941 |
| 2,277,005 | Ruse | Mar. 17, 1942 |
| 2,407,690 | Southworth | Sept. 17, 1946 |
| 2,451,732 | Hershberger | Oct. 19, 1948 |
| 2,467,230 | Revercomb et al. | Apr. 12, 1949 |
| 2,483,933 | Revercomb et al. | Oct. 4, 1949 |
| 2,497,670 | Hanson et al. | Feb. 14, 1950 |
| 2,500,752 | Hanson et al. | Mar. 14, 1950 |
| 2,519,750 | Ehlers | Aug. 22, 1950 |
| 2,593,120 | Dicke | Apr. 15, 1952 |
| 2,595,748 | Andrews | May 6, 1952 |
| 2,600,278 | Smullin | June 10, 1952 |
| 2,600,566 | Moffet, Jr. | June 17, 1952 |
| 2,612,596 | Gross | Sept. 30, 1952 |
| 2,634,331 | Honda | Apr. 7, 1953 |
| 2,650,289 | Hagopian | Aug. 25, 1953 |